United States Patent Office 3,201,369
Patented Aug. 17, 1965

3,201,369
HEAT STABLE POLYCARBONATES CONTAINING METAL SALTS OF OXYACIDS OF PHOSPHORUS
Richard G. Dell, Hanover Township, Morris County, N.J., and Richard A. Meinzer, Urbana, Ill., assignors to Allied Chemical Corporation, New York, N.Y., a corporation of New York
No Drawing. Filed May 29, 1961, Ser. No. 113,146
5 Claims. (Cl. 260—45.75)

This invention relates to heat-stable polycarbonate resin compositions, and more particularly, it relates to a process for the stabilization of bisphenol polycarbonate resins against the decompositional effects of heat.

Bisphenol polycarbonates are generally prepared by reaction of phosgene with a bisphenol according to the scheme,

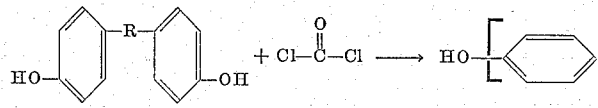 + $Cl-\overset{O}{\underset{\|}{C}}-Cl \longrightarrow$ 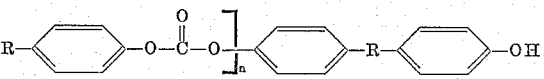

wherein R is a branched or unbranched hydrocarbon radical and $n$ is an integer from 40 to 400.

Polycarbonate resins have found extensive commercial application because of their excellent physical properties. These thermoplastic polymers appear to be particularly suitable for the manufacture of molded products wherein impact strength, rigidity, toughness, and excellent electrical properties are required. Unfortunately, polycarbonate compositions tend to discolor and depolymerize when they are heated to the high temperatures necessary for molding and extrusion operations. For example, the white resin, Lexan, which is obtained by the polymerization of bisphenol-A, is rapidly degraded at about 300° C. to a dark mixture of low molecular weight polymers.

It is, therefore, a principal object of this invention to prepare bisphenol polycarbonate resin compositions which exhibit stability against the decompositional effects of heat.

We have made the surprising discovery that polycarbonate resins of bisphenols can be stabilized against heat at temperatures as high as 325° C. by impregnating said resins with inorganic phosphorus compounds.

Inorganic phosphorus compounds which are suitable as heat-stabilizing agents can be designated by the general formula MA wherein M is magnesium, manganese, an alkali metal or an alkaline earth metal, A is the anion of an oxyacid of phosphorous, including orthophosphoric, metaphosphoric, pyrophosphoric, hypophosphoric, hypophosphorous, and phosphorous acids. Not all the metal salts of the phosphorus oxyacids are of equal stabilizing ability. The alkali metal salts, such as sodium, potassium, and lithium are better stabilizers than those salts derived from manganese, magnesium, and such alkaline earth metals as calcium and barium. Particularly suitable as stabilizers is the group of phosphorus compounds which consists of mono- and dibasic sodium phosphate, sodium phosphite ($NaH_2PO_3$) and tetrasodium pyrophosphate.

It is surprising to note that whereas the alkali metal salts of the phosphorus oxyacids as a group are particularly excellent heat-stabilizing agents for bisphenol polycarbonates, the ammonium salt has an exceedingly deleterious effect on these resins. This is particularly surprising since the ammonium radical is frequently grouped with the alkali metal cations because of its similarity in chemical properties.

Among the Group VIII metals of the periodic table, both the ferric and cobaltous salts of the phosphorus oxyacids are generally injurious at high temperatures to the bisphenol polycarbonates.

A variety of procedures may be used whereby the salts of the phosphorus oxyacids are incorporated with bisphenol polycarbonate resins. One procedure comprises admixing a solution of said polycarbonate resin with an equal volume of a buffered solution of an inorganic, phosphorus compound, evaporating the mixed solutions to dryness, and recovering the dried, salt-impregnated resin.

These impregnated resins can also be prepared by mixing a finely divided, phosphate salt with a fluid, polycarbonate resin. This mechanical combination can be achieved either by using a mill and grinding together the phosphorus compounds with the fluid resin, or admixing a powdered form of the resin with the solid phosphorus salts, heating the mixture, and then passing said mixture through an extruder.

In that procedure wherein solutions of the resin and the stabilizer are combined, the pH to which the phosphorus oxyacid salt solution is adjusted is extremely important. Inorganic phosphorus compounds which are excellent stabilizers at one pH, may be extremely poor stabilizers at another. Thus, treatment of bisphenol polycarbonates with buffered phosphate solutions whose acidity has been adjusted to the extremes of the pH range, produces polymeric compositions which readily decompose on heating to high temperatures. The utilization of buffered solutions in the pH range from about 2 to about 10 affords bisphenol polycarbonate resins of good stability to heat. Excellent results are obtained in the especially preferred pH range of 3 to 7.

Those metal salts of the phosphorus oxyacids, such as barium phosphate ($Ba_3(PO_4)_2$), whose hydrolysis products create a solution with a pH within the preferred range of 3–7, naturally need not be buffered.

The above-described pH requirement is likewise necessary for those procedures wherein the stabilizer and the resin are mechanically mixed, e.g., by extruding or milling. In these instances, the powdered, phosphorus oxyacid salt may be prepared by evaporating to dryness a buffered solution (pH 2–10) of said salt, or by adding when necessary to the dried inorganic phosphorus compound, a sufficient quantity of an alkali, so that the resulting mixture would possess a pH in the range of about 2–10, should said mixture of salts be taken up in aqueous solution.

The quantity of phosphorus oxyacid salt which is especially effective as a stabilizer for bisphenol polycarbonates ranges from about 0.05 to about 10 percent of the weight of the resin. However, percentages of phosphorus compound as low as 0.01%, and as high as 15% are applicable.

Polycarbonate resins for which the above-described phosphorus salts are effective as heat stabilizers, may be prepared from a large variety of bisphenols. Thus, polycarbonate resins prepared from an aromatic dicarbinol such as bisphenol-A, i.e., 2,2-bis(4-hydroxyphenyl)-propane

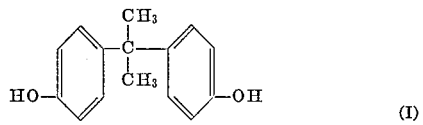

can be stabilized againnst the decompositional effects of heat when impregnated with the salts of the phosphorus oxyacids of our invention.

Additional representative examples of bisphenols whose polycarbonate derivatives can be stabilized against heat are the following:

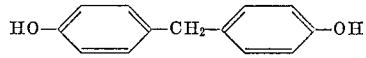

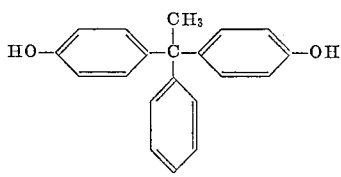

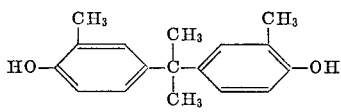

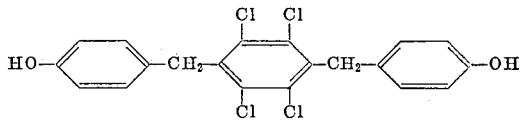

and

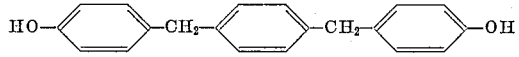

The following specific examples will further illustrate the invention. Percentages are by weight, and temperatures are in degrees centigrade.

EXAMPLE 1

Solutions containing 1.0 gram of bisphenol-A polycarbonate in 10 ml. of methylene dichloride were mixed with equal volumes of various 1 percent aqueous solutions of inorganic phosphates. The solvents were removed by evaporation, and the polycarbonate residue containing the phosphate was then heated for 1–2 hours at 325° in test tubes open to the air. After cooling, the color of the resin samples was compared visually. The results are illustrated in Table I.

*Table I*

| Stabilizer: | Color |
|---|---|
| None | Brown. |
| NaH$_2$PO$_3$ | White. |
| Na$_4$P$_2$O$_7$ | Yellow. |
| Na$_2$HPO$_4$ | White. |

EXAMPLE 2

Solutions of sodium hydroxide and phosphoric acid were mixed in various proportions to produce a range of buffered pH systems. Solutions of these sodium phosphates containing 0.01 gram of the sodium phosphate in 10 ml. of water were mixed with solutions of bisphenol-A polycarbonate containing 1.0 gram of the polycarbonate in 10 ml. of methylene dichloride. The mixed solutions were evaporated to dryness, and the polycarbonate residue containing 1 percent of the several sodium phosphates was heated for 2 hours at 325° in test tubes open to the air. It was then cooled to room temperature. The color of the resin samples was compared visually. The aged resins were dissolved in ethylene dichloride to form 0.1 percent solutions, and the viscosities of these dilute solutions were than measured at 25° in Ostwald-Fenske viscometers.

Molecular weights were then calculated using the following equations:

$$\eta_r = \frac{\frac{t}{t'} - 1}{c}$$

$$\eta_i = \eta_r - 0.02$$

$$MW^{0.83} = \frac{\eta_i}{1.23 \times 10^{-4}}$$

In these equations $t$ and $t'$ are the effluent times of the solutions of the polycarbonate and of the solvent, respectively, $c$ is the concentration of the polycarbonates in the solution in grams/100 cm.$^3$ of solvent, $\eta_r$ is the reduced viscosity, and MW is the molecular weight of the polycarbonate. Plotting the values for MW (as ordinates) at various values for intrinsic viscosity, $\eta_i$ (as abscissas), on common log-log graph paper gives a straight line, which is used to read directly the molecular weight.

The results are illustrated in Table III. In each case the molecular weight of the resin was initially 28,000.

*Table II*

| pH | Color | Molecular Weight |
|---|---|---|
| No buffer | Brown | 9,000 |
| 1 | Black | |
| 3 | Yellow | 27,000 |
| 5 | do | 24,000 |
| 7 | do | 17,000 |
| 9 | White | 12,500 |
| 11 | Black | 13,000 |

EXAMPLE 3

Example 2 was repeated using potassium hydroxide in place of sodium hydroxide. Once again, the initial molecular weight of the polycarbonate resin was 28,000 in all cases. The results are illustrated in Table III.

*Table III*

| pH | Color | Molecular weight |
|---|---|---|
| 1 | Dark brown | 13,000 |
| 2 | Very light amber | 18,000 |
| 3 | Light amber | 23,000 |
| 6 | do | 23,000 |
| 7 | do | 23,000 |
| 9 | do | 19,000 |
| 10 | do | 22,000 |
| 11 | Opaque red-brown | 1,000 |

EXAMPLE 4

Example 1 was repeated using a number of different phosphates as stabilizers. The initial molecular weight of the polycarbonate resin was once again 28,000 in every case. The results are illustrated in Table IV.

*Table IV*

| Phosphate | Color | Molecular Weight |
|---|---|---|
| None | Brown | 9,000 |
| Lithium | Light amber | 22,000 |
| Magnesium | do | 19,000 |
| Barium | do | 20,000 |
| Ammonium | Dark brown | 4,000 |
| Manganese [1] | Light amber | 22,500 |
| Manganese [2] | Dark brown | |
| Cupric | Light amber | 17,000 |
| Ferric | do | 13,000 |
| Cobaltous | Dark brown | 10,000 |

[1] Manganese phosphate was buffered by titrating it with phosphoric acid to pH 5.
[2] Unbuffered manganese phosphate.

EXAMPLE 5

Solutions of sodium hydroxide and phosphoric acid were mixed to give a solution having a pH of 3. Portions of the solution thus prepared were mixed with solutions of methylene dichloride of a bisphenol-A polycarbonate having a molecular weight of 28,000 in proportions to provide in the mixed solutions the percentages of sodium phosphate by weight of the polycarbonate shown in the following Table V. The mixed solutions were evaporated to dryness, and the polycarbonates containing varying proportions of sodium phosphate were heated for 2 hours at 325°, and then cooled to room temperature. Table V shows the molecular weights of the thus heated polycarbonates containing varying percentages of sodium phosphate stabilizer as compared with the molecular weight of the polycarbonate subjected to the same heat treatment, but with no addition of sodium phosphate.

Table V

| Percent sodium phosphate: | Molecular weight |
|---|---|
| 0.00 | 9,800 |
| 0.05 | 27,000 |
| 0.50 | 24,500 |
| 5.00 | 19,500 |
| 10.00 | 23,000 |

While the above describes the preferred embodiments of the invention, it will be understood that departures can be made therefrom within the scope of the specification and claims.

We claim:

1. A bisphenol polycarbonate resin composition comprising (a) a polycarbonate resin of the formula

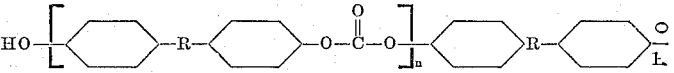

wherein R is a member selected from the group consisting of branched and unbranched hydrocarbon radicals and halogenated hydrocarbon radicals, and $n$ is an integer from 40 to 400 and (b) between about 0.01% and about 15% thereof by weight of a heat stabilizing agent of the general formula

MA wherein M represents a member selected from the group consisting of magnesium, manganese, the alkali and the alkaline earth metals; and A represents an inorganic anion of an oxyacid of phosphorus, said stabilizing agent having, in aqueous solution, a pH value between about 2 and about 10.

2. A composition of matter as described in claim 1, wherein the stabilizer is a sodium salt of an oxyacid of phosphorus.

3. A composition of matter as described in claim 1, wherein the bisphenol polycarbonate resin is a 2,2-bis(4-hydroxyphenyl) propane-polycarbonate resin.

4. The process for stabilizing a bisphenol polycarbonate resin of the formula

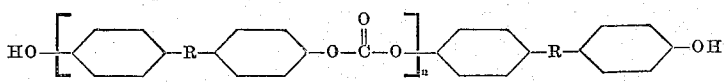

wherein R is a member selected from the group consisting of branched and unbranched hydrocarbon radicals and halohydrocarbon radicals, and $n$ is an integer from 40 to 400, against the degradative effects of heat, which comprises admixing with a solution of said resin a sufficient quantity of an aqueous solution, in the pH range of 2 to 10, of a stabilizer of the formula

MA wherein M is a member selected from the group consisting of magnesium, manganese, the alkali metals and the alkaline earth metals, and A is an anion of a phosphorus oxyacid, to provide between about 0.01% and about 15% by weight of salt in the dried resin, evaporating the solvents of the mixed solutions and recovering the dried salt-impregnated resin.

5. The process according to claim 4, wherein the bisphenol of the polycarbonate resin is 2,2-bis(4-hydroxyphenyl)-propane.

References Cited by the Examiner

UNITED STATES PATENTS

| 2,865,883 | 12/58 | Jackson | 260—45.75 |
| 2,924,586 | 2/60 | Lotz et al. | 260—45.75 |
| 2,964,797 | 12/60 | Peilstocker et al. | 260—47 |
| 2,967,774 | 1/61 | Bell et al. | 260—45.95 |
| 2,984,647 | 5/61 | White | 260—45.75 |
| 3,079,366 | 2/63 | Boyle et al. | 260—45.9 |
| 3,108,091 | 10/63 | Illing et al. | 260—45.75 |

FOREIGN PATENTS

| 772,627 | 4/57 | Germany. |

LEON J. BERCOVITZ, *Primary Examiner.*

MILTON STERMAN, *Examiner.*